Oct. 1, 1940.   R. W. GOFF   2,216,588
CONTROL DEVICE
Filed May 19, 1938

Inventor:
Robert W. Goff,
by Harry E. Dunham
His Attorney.

Patented Oct. 1, 1940

2,216,588

UNITED STATES PATENT OFFICE 2,216,588

CONTROL DEVICE

Robert W. Goff, Schenectady, N. Y., assignor to General Electric Company, a corporation of New York Application May 19, 1938, Serial No. 208,864

10 Claims. (Cl. 200—33)

My invention relates to control devices, more particularly to a circuit controlling device for governing machine-tool feed motors and the like, and has for its object the provision of a device of this character which gives a predetermined timing interval in performing its control function and which provides means for accurately adjusting this timing interval.

For feeding cutting tools into the work during machining operations in connection with automatic machinery, such as planers, shapers and milling machines, it is necessary to provide a control which will permit of easy adjustment and extremely accurate performance. In these machines at the end of each cutting stroke, it is desirable to feed the tools a predetermined amount preparatory to taking the next cutting stroke. To achieve the smooth, accurately machined surfaces generally desirable, each feeding of the tool during a particular operation should be precisely a predetermined amount as the cutting proceeds across the work. Accordingly, I have provided a device embodying my invention in one form for the purpose of starting and stopping the tool feed motors on a planer, although it is obvious that a control device of this character may be used with feed motors on a wide variety of machinery, as well as, having broad application to fields in which time interval control is necessary.

In the instant use described hereinafter, I prefer to operate the control device directly off the large bed-driving motor for the planer through an electro-magnetic clutch. When the planer bed arrives at its limit of movement and operates its limit switch, the clutch is energized and thereby engaged and at the same time the tool feed motor of the planer is energized and operates to advance the tool during the return stroke of the planer for the next cut. In the meantime, the control device is operated by the main driving motor, and after a predetermined period of operation for which the device is adjusted, it opens the circuit of the feed motor, the tool having then been advanced the desired amount for the next cut. Simultaneously with the opening of the circuit of the tool feed motor, the electromagnetic clutch of the controller is deenergized and an energy storing spring causes the timing mechanism of the control to be returned to its original position ready for a repeat performance.

Figure 1:
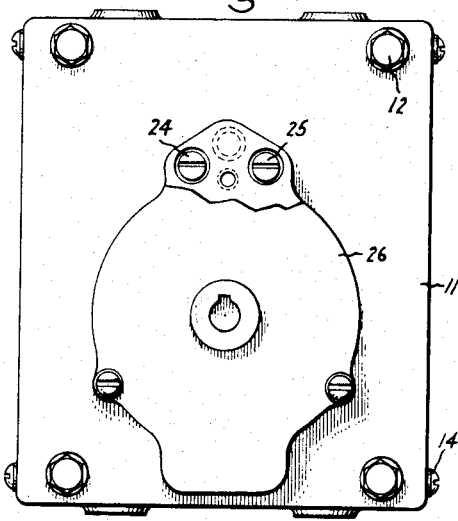
Figure 2:
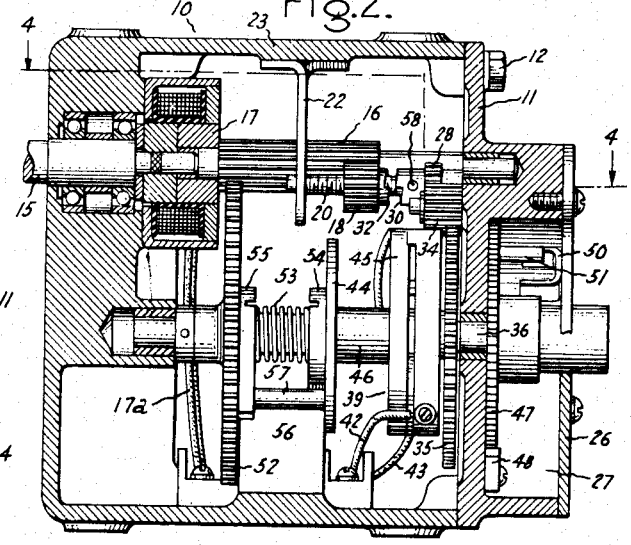
Figure 3:
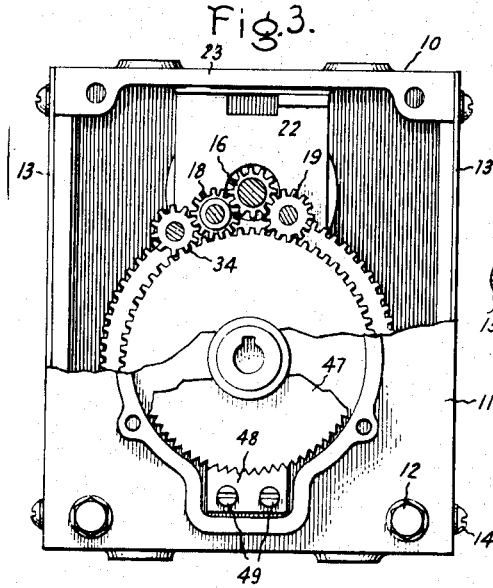
Figure 4:
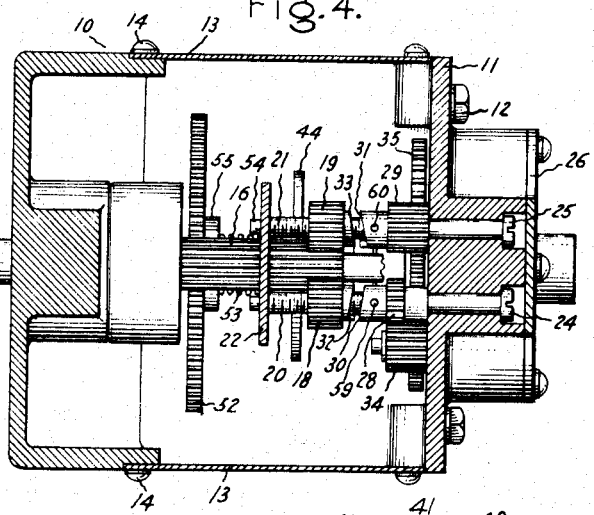
Figure 5:
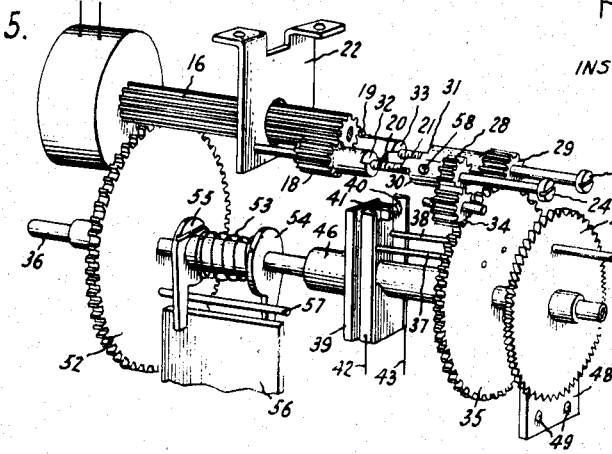
Figure 6:
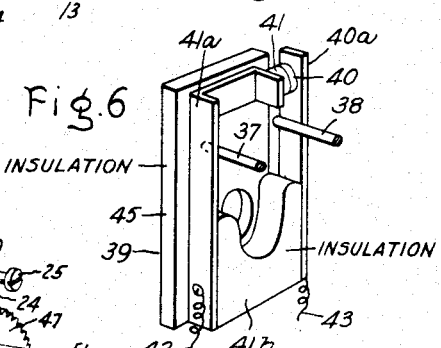

For a more complete understanding of my invention, reference should now be had to the accompanying drawing in which Fig. 1 is an elevational view of a casing containing a controller embodying my invention showing the cover plate of the gear box partly in section to illustrate details thereunder; Fig. 2 is a sectional view of the side of Fig. 1 revealing the controller mechanism; Fig. 3 is a front elevational view of Fig. 1 partly in section to reveal details of the gearing mechanism; Fig. 4 is a plan view of the controller in section taken along the line 4—4 of Fig. 2; Fig. 5 is a perspective view of the controller mechanism; and Fig. 6 is an enlarged perspective view of the switching element of my invention.

Referring to the drawing, I have shown my invention in one form as applied in the circuit of a tool feed motor used on a planer. The mechanism is shown enclosed in a suitable casing 10, preferably of iron-magnetic material provided with a front wall 11 secured by the bolts 12 and a pair of side walls 13 fastened by screws 14 threaded into the casing 10. Journaled through a thickened portion in the rear wall of the casing 10 is a drive shaft 15 which may be geared directly to the driving motor of the planer (not shown). Arranged to operatively connect the shaft 15 to an elongated driving gear 16 is an electromagnetic clutch 17 which may be energized through a suitable A. C. or D. C. circuit 17a when the planer bed has reached the end of its cutting stroke. Continuously meshed with the driving gear 16 are a pair of traveling pinions 18 and 19, set at each side of the driving gear 16, being mounted for translational movement in opposite directions along threaded screws 20 and 21 when rotated in the same direction with respect to each other by the driving gear. The threaded members 20 and 21 are supported at one end by a bracket 22 attached to the top wall 23 of the casing 10. For purposes of adjustment, to be explained hereinafter, the threaded members 20 and 21 project through the front wall 11 of the casing 10 and terminate with the slotted heads 24 and 25 which are accessible from the outside of the casing 10, when the cover plate 26 of the gear box 27 at the front of the casing is removed. Pinned to the screw members 20 and 21 are a pair of operating pinions 28 and 29 having the clutch faces 30 and 31 extending circumferentially around the screw members 20 and 21 and projecting in the direction of the traveling pinions 18 and 19. On the traveling pinions 18 and 19, I have provided the clutch faces 32 and 33 which are arranged to engage the corresponding clutch faces 30 and 31 for operating the operating pinions 28 and 29 when either of the pinions 18 or 19 has traveled on the threaded members 20 and 21 adjacent the operating pinions 28 and 29.

By threading the screw members 20 and 21 in opposite directions, that is, giving them left and right hand threads respectively, rotation of the driving gear 16 in either direction will cause one of the traveling pinions 18 and 19 to move in the direction of one of the operating pinions 28 or 29 while the other of the traveling pinions moves away from the corresponding operating pinion. By the device of an idling pinion 34 between the operating pinion 28 and a suitable control member, such as a large switching gear 35, and by meshing the operating pinion 29 directly with the control member or switching gear 35, the operation of the gearing system is such that by rotating the driving shaft 15 in either direction, the switching gear 35 is caused to revolve in only one direction. In this way the controller is provided with a reversible feature since the driving shaft 15 may be operated in either direction, yet the switching gear 35 will operate only in the desired direction.

Journaled in the rear wall of the casing and projecting through the front wall 11 is a switching shaft 36, upon which the switching gear 35 is loosely mounted. Projecting from one face of the switching gear 35 are a pair of pins 37 and 38 which cooperate with a suitable switching member 39 secured on the shaft 36 for disconnecting a movable contact 40 from a fixed contact 41 carried by the switching member 39. Since the switching gear 35 will only turn in one direction upon rotation in either direction of the driving gear, it will always turn in a clockwise direction, as viewed from the right end of the shaft 36, for disengaging the contacts 40 and 41 when it is operated. Although I have shown the control member 35 as a switching gear provided with the pins 37 and 38 for operating an electrical switch, I do not wish necessarily to be limited in this respect, since it is believed obvious that the control member 35 might well be a rheostat arm, an operating member for a non-electrical device, such as a clutch, or the like without departing from the spirit and scope of my invention.

Connecting the contacts 40 and 41 of the switching member 39 in circuit with the feed motor to be controlled and in an auxiliary circuit through which the electromagnetic clutch 17 is energized are a pair of leads 42 and 43. I prefer to form the switching member 39 of suitable insulating material having an insulating disk 44 spaced from an insulating plate 45 by an insulating sleeve 46 which fits over the shaft 36 and provides a spool about which the leads 42 and 43 may wind when the shaft 36 is rotated. The operating pins 37 and 38 projecting from the switching gear 35 may also be suitably insulated or be formed of insulating material. As shown in Fig. 6, the fixed contact 41 is supported by an angular terminal member 41a secured to the plate 45. The movable contact 40 is supported by a flexible terminal strip 40a having its fixed end secured to a spacer block 41b of insulating material fastened near the bottom of the plate 45, the spacer block 41b serving to separate and also support the terminal strips 40a and 41a.

At the front of the casing 10 in the gear box 27 which is closed by the cover plate 26 is an adjusting gear 47 keyed to the shaft 36 and slidable thereon. Normally the adjusting gear 47 is in engagement with a stop 48 attached to the casing 10 by means of screws 49, which prevents the shaft 36 from rotating. By pulling the adjusting gear 47 forward out of contact with the teeth of the stop 48, it is possible to rotate the gear 47 the desired amount for setting the controller. Rotation of the gear 47 turns the shaft 36, and with the shaft the switch member 39 and through the pins 37 and 38 the switching gear 35 is driven. The switching gear 35 drives the operating pinions 28 and 29 and through them adjusts the positions of the traveling gears 18 and 19. Of course, the distance these traveling gears 18 and 19 have to travel to actuate the switching gear to open the feed motor circuit determines the timing setting of the controller, and the period during which the tool feed motor operates is thereby regulated. Carried by the cover plate 26 is a stop 50 which limits the amount that the adjusting gear 47 may be turned by bumping a projection 51 extending from the gear. At any time when the controller is set to perform its timing function, the traveling pinions 18 and 19 are spaced equidistant from the operating pinions 28 and 29, so that in either direction of rotation of the shaft 15, one of the traveling pinions must move a predetermined amount before the switching operation is effected.

Loosely journaled on the shaft 36, continuously meshed with the driving gear 16 is a return gear 52 arranged to return the traveling pinions 18 and 19 to their starting position after the switching has occurred and the electromagnetic clutch 17 de-energized. By means of a double-acting spring 53 encircling the shaft 36 and attached at each end to the members 54 and 55 which cooperate with a detent member 56 positioned therebetween and a projection 57 from the gear 52 also extending between the members 54 and 55, energy is stored in the spring 53, when the controller operates, which is used to return the controller to its starting position when the clutch 17 is disconnected. The return gear 52 together with the spring force of the spring 53 also serves to hold the driving gear 16 stationary to force the traveling pinions 18 and 19 to be threaded to the new position, while an adjustment is made by the adjusting gear 47.

In operation of the controller, the drive shaft 15 is directly geared to the reversing driving motor of the planer to be controlled. When the planer reaches the end of its cutting stroke, a limit switch is thrown which reverses this motor. Simultaneously, the electromagnetic clutch 17 is caused to be energized and the feed motor which feeds the tool is placed in operation. The rotational force of the shaft 15 is then transferred to the driving gear 16, and we will assume for purposes of discussion the direction of rotation to be such that the traveling pinion 18 is threaded toward the operating pinion 28 while the other traveling pinion 19 is threaded a corresponding amount away from the operating pinion 29. When the cam face 32 of the traveling pinion 18 engages the cam face 30 of the operating pinion 28, the idling gear 34 and through it the switching gear 35 is rotated in a clockwise direction.

Rotation of the switching gear 35 forces the pin 38 against the movable contact 40 and disengages this contact from the stationary contact 41 on the switching member 39. When the controller circuit is broken, as hereinbefore explained, the feed motor circuit is deenergized, the feeding now being complete; and simultaneously, the electromagnetic clutch is deenergized to free the shaft 15 from the driving gear 16. Immediately upon disengaging the shaft 15 from the gear 16, the spring force which was built up in the energy storing spring 53 causes the return gear 52 to rotate the gear 16 which threads the traveling pinions 18 and 19 back to their starting position and permits the contacts 40 and 41 to reengage. In this manner the feeding of the tool occurs during the return stroke of the planer, and thereafter the tool is in its correct cutting position ready for the cutting stroke.

Referring now to Fig. 2 and Fig. 3, to assemble the traveling pinions 18 and 19 and the operating pinions 28 and 29 on their respective threaded members 20 and 21 and to adjust the clutch faces 30, 32, 31, and 33 so they are in respective engagement at a zero setting of the adjusting gear 47, the threaded members 20 and 21 are first pushed through the front wall 11 of the casing 10. The operating pinions 28 and 29 are slipped over the threaded members 20 and 21 and meshed with the switching gear 35. By screwing the threaded members 20 and 21 at their slotted head portions 24 and 25 with a screw driver, the traveling pinions 18 and 19 may be meshed with the driving gear 16 and slidably drawn up close to the operating pinions 28 and 29 which are loosely mounted on unthreaded portions of the members 20 and 21. The ends of the members 20 and 21 extending into the casing 10 may then be projected for support into holes in the supporting member 22. Each of the traveling pinions 18 and 19 may then be drawn up to engage its clutch face with the mating clutch face on the operating pinions 28 and 29, leaving sufficient clearance between the clutches for easy engagement and disengagement. Provided in each of the operating pinions 28 and 29 is a tapped hole 58 into which a temporary set screw may be turned for holding the operating pinions 28 and 29 in place on the members 20 and 21, while holes for the pins 59 and 60 are being drilled and the pins inserted. After pinning the operating pinions 28 and 29 to the members 20 and 21, the switch member 39 may be pinned to the shaft 36 so that the movable contact 40 is disposed adjacent the switching pin 38 on the switching gear 35 ready to be disengaged by the rotation of the gear 35. The controller is then ready to be adjusted by rotation of the adjusting gear 47 which causes the traveling pinions 18 and 19 to be threaded back away from the operating pinions 28 and 29 equal distances, as hereinbefore explained, that in turn determine the timing of the control device for either direction in which the driving shaft 15 may be rotated.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. A circuit controller provided with switching means adapted to be operated after a predetermined time interval comprising driving means for said controller mounted for rotation in either direction, timing means driven by said driving means including a pair of traveling member mounted for travel in opposite directions for providing said predetermined time interval of operation in either direction of rotation of said driving means, and means including a member associated with said timing means operable in a predetermined direction by said traveling members selectively for actuating said switching means.

2. A circuit controller provided with switching means adapted to be operated after a predetermined time interval comprising driving means for said controller mounted for rotation in either direction, timing means including a pair of traveling pinions driven by said driving means and mounted for travel in opposite directions for providing said predetermined time interval of operation in either direction of rotation of said driving means, means including a gear associated with said timing means operable in a predetermined direction for actuating said switching means, and means for automatically resetting said timing means and said switching means after said switching means has been operated.

3. A circuit interrupter normally closed and adapted to be opened after a predetermined timing interval comprising driving means, means including a driving gear arranged to be connected to said driving means at the beginning of said timing interval, a traveling pinion meshed with said gear, said pinion being provided with a clutch face, a threaded member upon which said pinion may travel from a first position to a second position upon being rotated by said driving gear, an operating pinion fixed to said threaded member having a clutch face arranged to be engaged by said clutch face on said traveling pinion, a switching gear meshed with said operating pinion, switching means including a pair of contacts normally closed and arranged to be opened by rotation of said switching gear, said timing interval being dependent upon the length of travel of said traveling pinion from said first position to said second position, and means including a gear and an energy-storing spring for returning said traveling pinion to said first position after said driving gear has been disconnected from said driving means.

4. A circuit controller adapted to provide a predetermined time interval of operation by timing means including a traveling pinion having a clutch face, a threaded member upon which said pinion may travel, an operating pinion secured to said threaded member having a clutch face arranged to be engaged by said clutch face on said traveling pinion, switching means operated by said operating pinion, and means to manually rotate said operating pinion and said threaded member independent of the traveling pinion for changing said starting position of said traveling pinion, thereby adjusting the timing of said controller.

5. In combination with a casing for a circuit controller, said controller having switching means and providing a predetermined time interval of operation thereof by timing means including a traveling pinion having a clutch face, a threaded member upon which said pinion may travel, and an operating pinion for said switching means to be secured to said threaded member and having a clutch face arranged to be engaged by said clutch face on said traveling pinion of means for assembling and adjusting the clearance of said clutch faces including a head on said threaded member accessible from the exterior of said casing by which said threaded member may be turned.

6. A control device provided with switching means adapted to be operated after a predetermined time interval comprising driving means including a shaft mounted for rotation in either direction, a driving gear, an electromagnetic clutch disposed intermediate said driving gear and said shaft arranged to be energized at the beginning of said time interval for coupling said gear and said shaft, means including a pair of traveling pinions meshed with said driving gear adapted to travel from an initial position in respectively opposite directions and provided with clutch faces, a pair of threaded members along which said traveling pinions may travel having secured thereon a pair of operating pinions provided with clutch faces arranged to be selectively engaged by said clutch faces on said traveling pinions in either direction of rotation of said driving gear, and means including a switching gear meshed with said operating pinions and adapted to be revolved in a predetermined direction thereby for operating said switching means, said time interval being dependent on the length of travel of said traveling pinions and being obtainable in either direction of rotation of said driving means.

7. A control device provided with switching means adapted to be operated after a predetermined time interval comprising driving means including a shaft mounted for rotation in either direction, a driving gear, an electromagnetic clutch disposed intermediate said driving gear and said shaft arranged to be energized at the beginning of said time interval for coupling said gear and said shaft, means including a pair of traveling pinions meshed with said driving gear adapted to travel from an initial position in respectively opposite directions and provided with clutch faces, a pair of threaded members along which said traveling pinions may travel having secured thereon a pair of operating pinions provided with clutch faces arranged to be selectively engaged by said clutch faces on said traveling pinions in either direction of rotation of said driving gear, and means including a switching gear meshed with said operating pinions and adapted to be revolved in a predetermined direction thereby for operating said switching means, said time interval being dependent on the length of travel of said traveling pinions and being obtainable in either direction of rotation of said driving means, and means including a gear and a double acting spring associated with driving gear for returning said traveling pinions to said initial position after said electromagnetic clutch is deenergized.

8. A time element control device comprising a driving member mounted for rotation in either direction, two rotatable traveling members connected to be rotated by said driving member, means mounting said traveling members for rotation and for translational movement in opposite directions when rotated by said driving member, and a control member operated by said traveling members in a predetermined direction selectively.

9. A time element control device comprising a driving member mounted for rotation in either direction, two rotatable traveling members connected to be rotated by said driving member in the same direction with respect to each other, means mounting said traveling members for rotation and for translational movement in opposite directions when rotated by said driving member, and a control member operated by the one of said traveling members moving in a predetermined one of said translational directions.

10. A time element control device comprising a rotatably mounted control member, two driving members operatively connected to said control member for selective rotation in opposite directions to turn said control member in a predetermined direction, a main driving member mounted for rotation in either direction, two rotatable traveling members connected to be rotated by said main driving member in the same direction with respect to each other, and means mounting said traveling members for rotation and translational movement in opposite directions when rotated by said master driving member to bring one of said traveling members into rotary driving relation with one of said driving members and thereby turn said control member in a predetermined direction.

ROBERT W. GOFF.